United States Patent [19]

Ludkovsky

[11] Patent Number: 4,917,358
[45] Date of Patent: Apr. 17, 1990

[54] APPARATUS FOR PRODUCING ELECTRICAL STEEL CORE LAMINATIONS

[75] Inventor: Gregory Ludkovsky, Munster, Ind.

[73] Assignee: Inland Steel Company, Chicago, Ill.

[21] Appl. No.: 367,981

[22] Filed: Jun. 19, 1989

Related U.S. Application Data

[62] Division of Ser. No. 223,807, Jul. 25, 1988, Pat. No. 4,871,403.

[51] Int. Cl.⁴ .............................................. C21D 1/42
[52] U.S. Cl. .................................... 266/104; 266/105; 266/110
[58] Field of Search ...................... 266/104, 105, 110; 148/111, 121, 16, 307; 219/10.41, 10.57

[56] References Cited

U.S. PATENT DOCUMENTS

| | | | |
|---|---|---|---|
| 4,081,296 | 3/1978 | Janatka et al. | 148/16 |
| 4,390,378 | 6/1983 | Rastogi | 148/111 |
| 4,601,766 | 7/1986 | Rastogi et al. | 148/111 |
| 4,602,969 | 7/1986 | Koshiishi et al. | 148/121 |
| 4,772,341 | 9/1988 | Rastogi et al. | 148/307 |

FOREIGN PATENT DOCUMENTS

| | | | |
|---|---|---|---|
| 0143026 | 8/1984 | Japan | 266/105 |
| 0855012 | 8/1981 | U.S.S.R. | 266/105 |

Primary Examiner—S. Kastler
Attorney, Agent, or Firm—Marshall, O'Toole, Gerstein, Murray & Bicknell

[57] ABSTRACT

Core laminations are stamped from electrical steel strip and stress annealed by induction heating in a closed tubular chute inclined downwardly from the stamping press. A preselected, non-ambient atmosphere is maintained within the chute.

5 Claims, 1 Drawing Sheet

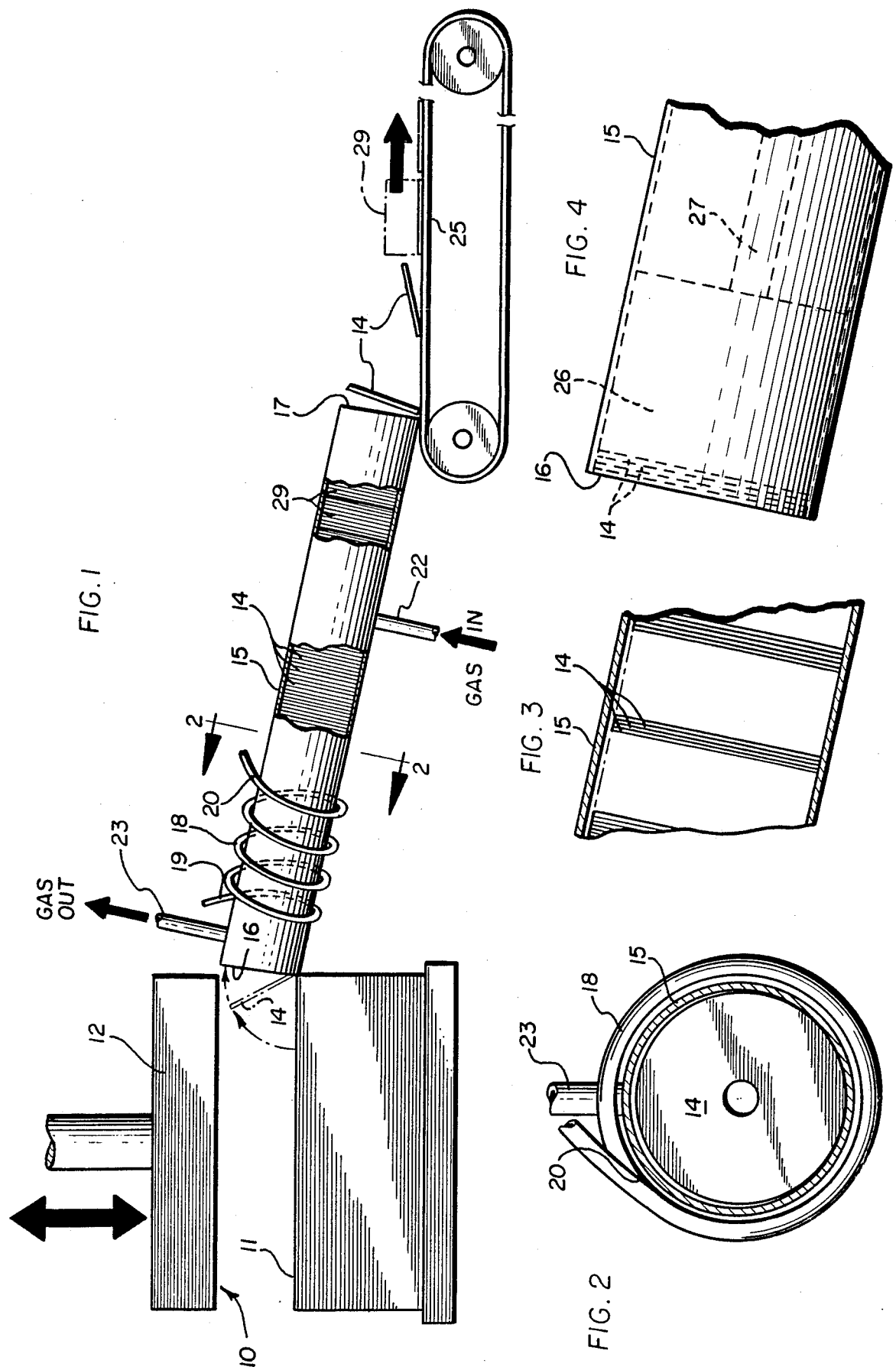

APPARATUS FOR PRODUCING ELECTRICAL STEEL CORE LAMINATIONS

This is a division of application Ser. No. 223,807 filed July 25, 1988, now U.S. Pat. No. 4,871,403.

BACKGROUND OF THE INVENTION

The present invention relates generally to the production of electrical steel core laminations and more particularly to a method and apparatus for doing so.

Electrical steel core laminations are used in the cores of rotors and stators for electric motors and in the cores of small transformers, for example. These laminations are stamped by a manufacturer thereof from cold rolled steel strip which is usually subjected to a decarburizing anneal either before the stamping operation, by the steel maker, or after the stamping operation, by the manufacturer of the laminations. The considerations involved in the composition and processing of the cold rolled steel strip before stamping, in the decarburization thereof and in the stamping, annealing and other operations performed by either the steel maker or the manufacturer of the laminations, are discussed in some detail in Rastogi U.S. Pat. No. 4,390,378 and in Rastogi, et al. U.S. Pat. No. 4,601,766, and the disclosures of both of these patents are incorporated herein by reference.

It is usually more desirable for the decarburizing anneal to be performed by the steel maker rather than by the lamination manufacturer. In those situations where the manufacturer of the lamination does not perform a decarburizing anneal after stamping the lamination, another type of anneal is usually performed to relieve the stresses resulting from the stamping operation and to enhance the magnetic properties of the lamination.

All anneals performed by the manufacturer of the lamination, whether a decarburizing anneal or a stress relieving anneal, are usually conducted at a location remote from the stamping press at which the lamination was made. Typically, the lamination is conducted away from the stamping press through a downwardly inclined chute having an upper, entry end located adjacent the stamping press to receive a lamination after it has been stamped on the press. The chute is typically trough-shaped, open at the top, and the chute communicates at its lower, exit end with a conveyor or other material handling device for transporting the laminations from the exit end of the chute to an annealing furnace. The laminations move through the downwardly inclined chute at least partially under the urging of gravity.

The annealing furnace may be gas fired, for example, or an induction furnace may be employed.

Koshiishi, et al. U.S. Pat. No. 4,602,969 discloses a method for subjecting core blanks (laminations) to a stress relieving anneal after the core blanks have undergone blanking, presumably at a stamping press. The core blanks are transported by a conveyor, presumably from the stamping press, to annealing equipment wherein the core blanks are initially elevated upwardly through a vertical tube containing induction heating coils. At the top of the induction heating tube, the core blanks are discharged onto another conveyor which transports the core blanks through a soaking heating chamber followed by a cooling chamber. In Koshiishi, et al. the core blanks are annealed after they have been conveyed away from the stamping press to an annealing furnace remote from the press, and complicated apparatuses are employed to elevate the stamped laminations through the vertically disposed induction heating arrangement, and then to convey the core blanks through additional heat treating equipment. The core blanks are subjected to loading and unloading operations at an annealing furnace, as well as other material handling operations, separate and discrete from those employed to conduct the core blanks away from the stamping press.

SUMMARY OF THE INVENTION

The present invention is directed to a method and apparatus for subjecting a stamped core lamination to a stress relief anneal under conditions which minimize loading, unloading and other handling of the stamped laminations and shorten the annealing time.

In accordance with the present invention, the downwardly inclined chute through which the laminations are conducted away from the stamping press has a tubular cross section so as to totally enclose the laminations in the chute. The stress relief anneal is performed by induction heating the laminations in the chute, as the laminations are conducted away from the stamping press. The laminations in the chute are maintained in tightly packed, face to face, abutting relation without intentional spacing between adjacent laminations, during the totality of the time the laminations are undergoing induction heating. Preferably a non-oxidizing atmosphere is maintained within the chute. The time, temperature and atmospheric conditions employed in connection with the annealing operation are such that the steel strip may be coated with an inorganic coating or a combination of inorganic and organic coatings prior to the stamping step, and those coatings are not adversely effected during the annealing operation.

The upper, inlet end of the downwardly inclined chute is located adjacent the stamping press and receives laminations directly from the stamping press, without any intermediate conveyance. Laminations withdrawn from the lower, exit end of the downwardly inclined chute have, by then, been subjected to the desired stress relief anneal and may be used in a motor or transformer core without further heat treatment. Conveying the laminations to an annealing furnace at a location remote from the stamping press, and loading and unloading the laminations into and out of the remote annealing furnace are eliminated.

The annealing furnace itself, and the apparatus for conducting the laminations through the annealing furnace are relatively uncomplicated.

Other features and advantages are inherent in the method and apparatus claimed and disclosed or will become apparent to those skilled in the art from the following detailed description in conjunction with the accompanying drawings.

BRIEF DESCRIPTION OF THE DRAWINGS

FIG. 1 is a schematic diagram, in side elevation, illustrating an embodiment of a method and apparatus for manufacturing electrical steel laminations in accordance with the present invention;

FIG. 2 is an enlarged, sectional view taken along line 2—2 in FIG. 1;

FIG. 3 is an enlarged, fragmentary, sectional view of a portion of the apparatus illustrated in FIG. 1; and FIG. 4 is an enlarged, fragmentary view of another portion of the apparatus illustrated in FIG. 1.

DETAILED DESCRIPTION

Referring initially to FIG. 1, indicated generally at 10 is a stamping press comprising a lower stationary part or fixed die 11 and an upper, vertically movable part 12 for stamping a lamination 14 from electrical steel strip. Stamping press 10 is of conventional construction.

A downwardly inclined, tubular chute 15 has an upper, entry end 16 located adjacent stamping press 10. Entry end 16 comprises means for receiving a lamination 14 stamped at press 10. Lamination 14 is delivered from press 10 to the adjacent upper entry end 16 of chute 15 in a conventional manner employing conventional devices heretofore employed to deliver laminations from a stamping press to the trough-shaped chute conventionally employed with such stamping presses.

In another embodiment, the fixed die 11 is located higher than the chute's entry end 16, and the stamped lamination drops through the bottom of fixed die 11 and is guided, in a conventional manner, to the chute's entry end 16.

Chute 15 extends in a downwardly inclined direction from upper entry end 16 to an exit end 17 which is lower than entry end 16. The angle of inclination of chute 15 is typically downward at 45°. Downwardly inclined chute 15 comprises structure for conducting laminations away from stamping press 10. Because of its closed, tubular construction (FIGS. 1 and 2) chute 15 totally encloses laminations 14.

Located around at least a portion of the length of tubular chute 15 is an induction heating coil 18, for annealing laminations 14 conducted away from stamping press 10 by chute 15. Opposite ends of coil 18 are electrically coupled to a power source (not shown) in a conventional manner. In the embodiment shown in FIG. 1, induction heating coil 18 extends from an upper, terminal position 19 adjacent entry end 16 of chute 15, to a lower terminal position 20 at an intermediate location on the chute, lower than chute entry end 16 and higher than chute exit end 17.

Chute 15 is tubular and closed along at least that portion of the chute around which induction heating coil 18 is located. Chute 15 can be tubular and closed along its entire length, although it need not be when induction heating coil 18 does not encircle tube 15 for the tube's entire length.

As shown in FIGS. 1 and 3, laminations 14 in chute 15 are maintained in a tightly packed, face to face, abutting relation without intentional spacing between the laminations along at least that portion of the chute around which induction heating coil 18 is located.

Located adjacent chute exit end 17 is a conveyor 25 for receiving and conveying away from chute 15 laminations 14 which exit from chute exit end 17.

When chute 15 is empty, at the beginning of a stamping operation, there is located within chute 15, at upper entry end 16, a steel dummy bar 26 attached to an arm 27 (FIG. 4). The first lamination 14 introduced into chute 15 through upper entry end 16 abuts against dummy bar 26, and as additional laminations 14 are received within chute 15 through upper entry end 16, dummy bar 26 is withdrawn, incrementally, downwardly through chute 15, by a pulling action exerted on arm 27. Eventually, dummy bar 26 is withdrawn entirely from chute 15, at which time chute 15 is filled with tightly packed, face to face, abutting laminations 14, i.e. a continuum of individual laminations. Dummy bar 26 maintains the laminations in that relationship from the time the first two laminations have been received within chute 151 until the dummy bar is withdrawn from chute 15 through exit end 17.

In addition to working on a continuum of individual laminations 14, the annealing step ca be employed on a continuum of bundles 29, (FIG. 1), each assembled from a sub-continuum comprising a number of laminations 14 equal to the number in a rotor or stator. Bundles 29 are assembled prior to being received within chute 15 at upper entry end 16. All of the laminations 14 within a bundle 29 are in tightly packed, face to face, abutting relation, and all of the bundles 29 in chute 15 are in tightly packed, face to face, abutting relation with each other. Conveyor 25 conducts away from chute 15 bundles 29 exiting chute 15 at exit end 17 (dash-dot lines in FIG. 1).

At the beginning of an annealing operation, one or more bundles 29 may be employed in lieu of dummy bar 26 (FIG. 4), and those bundles perform the same function as the dummy bar. Steel dummy bar 26, or one or more bundles 29 employed in lieu of a dummy bar, preferably should extend the full length of induction heating coil 18, from position 19 to position 20 (FIG. 1), as this will permit an immediate start of the induction heating operation once the first lamination 14 is received at chute entry end 16.

When bundles 29 are employed, upper terminal position 19 of coil 18 is spaced from chute entry end 16 a distance equal to or greater than the dimension of a bundle in the lengthwise direction of chute 15. This spacing accommodates the time delay between the introduction of two adjacent bundles 29 at chute entry end 16 and permits the maintenance of a continuum of bundles 29 between the coil's two terminal positions 19 and 20.

Associated with chute 15 is a gas inlet 22 positioned on chute 15 at a first location thereon relatively remote from chute entry end 16. Also associated with chute 15 is a gas outlet 23 positioned on chute 15 at a second location thereon higher than the location of gas inlet 22 and closer to chute entry end 16. Gas inlet 22 is employed for introducing a gaseous medium into chute 15, and gas outlet 23 is employed for withdrawing from chute 15 the gaseous medium introduced at gas inlet 22. The gaseous medium is employed to maintain a preselected, non-ambient atmosphere within chute 15 between gas inlet 22 and gas outlet 23.

Gas outlet 23 is preferably located on chute 15 no lower than upper terminal position 19 of coil 18, and gas inlet 22 is preferably located on chute 15 no higher than lower terminal position 20 of coil 18. Positioning the gas inlet and outlet, thusly, assures that laminations 14 are subjected to the desired atmosphere during the totality of the time the laminations are subjected to induction heating by coil 18.

The cold rolled steel strip from which laminations 14 are stamped has previously been decarburized to the extent desired, before the stamping operation, and the annealing operation conducted in chute 15 is a non-decarburizing anneal. Accordingly the gaseous atmosphere maintained within chute 15 is non-decarburizing and usually non-oxidizing.

Steels which have been fully decarburized, e.g. to a carbon content of 0.007 wt. % or less, are oftentimes referred to as fully processed or full hard electrical steels. Steels which have not been fully decarburized are referred to as semi-processed steels. The method and apparatus of the present invention can be employed on both fully processed steels and semi-processed steels, but on the latter only in those situations where relatively high magnetic properties are not necessary.

In the preferred embodiment illustrated in FIG. 1, the annealing step is initiated at 19, adjacent upstream end 16 of chute 15 and terminated at intermediate location 20 downstream of where the annealing step was initiated and upstream of downstream end 17 of chute 15. As noted above, laminations 14 are totally enclosed within closed tubular chute 15 for at least the time during which they are subjected to the annealing step.

The laminations are cooled between intermediate location 20 and downstream chute end 17. The annealing operation is typically conducted at a temperature in the range 900°–1500° F. (482°–816° C.) for a time period in the range 1–5 minutes. Laminations 14 normally spend a period of time in chute 15 longer than the time required for a stress relief anneal. For example, a typical chute 15 is 10 ft. (305 cm.) long, and the laminations move through the chute at the rate of about 4 inches (10 cm.) per minute. Under those conditions, the laminations spend about 30 minutes in the chute. A heating coil which surrounded chute 15 for about 20 inches (51 cm.) along the chute's length would produce a heating period of about 5 minutes. If the laminations were induction heated along the upper 20 inches of chute 15, they would then undergo cooling for the remainder of the time they spent in the chute, e.g. 25 minutes of cooling.

The annealing operation can be completed in a relatively short period of time because of the rapidity with which the laminations are heated by induction heating. However, induction heating is useful only if the parts subjected thereto are tightly packed for the entirety of that portion of the length of chute 15 which is surrounded by induction heating coil 18. In other words, coil 18 must surround a continuum of laminations 14 within chute 15 in order to accomplish induction heating.

As noted above, during the annealing operation the laminations are subjected to a preselected, non-ambient atmosphere which is typically non-oxidizing, e.g. an inert gas such as dry nitrogen or argon or a reducing gas such as a hydrogen-nitrogen mixture. It is desirable to avoid an ambient atmosphere within chute 15, thereby avoiding the formation of a flaky oxide on laminations 14. In addition to the gaseous atmospheres described above, one may alternatively employ a wet nitrogen atmosphere to apply a protective coating on laminations 14, a so-called bluing operation. The wet nitrogen atmosphere would have a conventional composition heretofore used for bluing purposes.

When the atmosphere within chute 15 is non-ambient and nonoxidizing, the steel strip from which the laminations are stamped may be coated, prior to the stamping step, with an inorganic coating or a combination inorganic-organic coating, and that coating will not be adversely effected during the annealing of the laminations in chute 15 because of the provision within chute 15 of a non-oxidizing, gaseous atmosphere. The coating applied to the steel strip, before stamping, may be one of several conventional coatings which have heretofore been applied to fully processed cold rolled steel strip, before the strip was subjected to a stamping operation to produce laminations, e.g. phosphate or chromate coatings. Inorganic or combination inorganic-organic coatings can withstand the temperature to which the laminations are subjected during a stress relief anneal in accordance with the present invention. A pure organic coating cannot be used because it would decompose at that temperature.

The foregoing detailed description has been given for clearness of understanding only, and no unnecessary limitations should be understood therefrom, as modifications will be obvious to those skilled in the art.

I claim:

1. In combination:

a stamping press comprising means for stamping laminations from steel strip;

a downwardly inclined, tubular, chute having an upper entry end located adjacent said stamping press and comprising means for receiving laminations stamped at said press;

said tubular chute comprising means for conducting laminations away from said stamping press;

said tubular chute comprising means for totally enclosing said laminations along at least a portion of the length of said chute;

and induction heating coil means, located around said enclosed chute portion, for annealing laminations conducted away from said stamping press by said chute.

2. In the combination of claim 1 and comprising:

means for maintaining said laminations in said chute in tightly packed, face to face, abutting relation without intentional spacing between said laminations along at least that portion of said chute around which said induction heating coil means is located.

3. In the combination of claim 1 wherein:

said chute has an exit end lower than said entry end;

and said induction heating coil means extends from an upper terminal position adjacent said entry end of the chute and terminates at a lower terminal position at an intermediate location on said chute lower than said entry end and higher than said exit end.

4. In the combination of claim 1 and comprising:

gas inlet means on said chute, at a first location thereon, relatively remote from said entry end of the chute, for introducing a gaseous medium into said chute;

and gas outlet means on said chute, at a second location thereon, higher than said location of said gas inlet means, for withdrawing, from said chute, gaseous medium introduced at said gas inlet means.

5. In the combination of claim 4 wherein:

said induction heating coil means has an upper terminal position and a lower terminal position on said chute;

said gas outlet means is located no lower than said upper terminal position of said coil means;

and said gas inlet means is located no higher than said lower terminal position of said coil means.

* * * * *